(12) United States Patent
Hardy

(10) Patent No.: US 9,764,834 B2
(45) Date of Patent: Sep. 19, 2017

(54) KITE FOR A SYSTEM FOR EXTRACTING ENERGY FROM THE WIND

(75) Inventor: John William Hardy, Burnham-On-Crouch (GB)

(73) Assignee: Kite Power Solutions Limited, Burnham-On-Crouch (GB)

( * ) Notice: Subject to any disclaimer, the term of this patent is extended or adjusted under 35 U.S.C. 154(b) by 0 days.

(21) Appl. No.: 14/239,757

(22) PCT Filed: Aug. 14, 2012

(86) PCT No.: PCT/EP2012/065896
§ 371 (c)(1),
(2), (4) Date: Feb. 19, 2014

(87) PCT Pub. No.: WO2013/026746
PCT Pub. Date: Feb. 28, 2013

(65) Prior Publication Data
US 2014/0210212 A1 Jul. 31, 2014

(30) Foreign Application Priority Data
Aug. 25, 2011 (EP) .................................... 11178881

(51) Int. Cl.
*B64C 31/06* (2006.01)
*F03D 5/00* (2006.01)
(Continued)

(52) U.S. Cl.
CPC ................ *B64C 31/06* (2013.01); *F03D 5/00* (2013.01); *F03D 5/005* (2013.01); *F03D 9/25* (2016.05);
(Continued)

(58) Field of Classification Search
CPC .... A63H 27/08; A63H 27/085; A63H 27/002; B64C 31/06; B63B 35/7979
(Continued)

(56) References Cited

U.S. PATENT DOCUMENTS 4,251,040 A * 2/1981 Loyd .............................. 244/154
4,662,588 A * 5/1987 Henderson ................. 244/118.2
(Continued)

FOREIGN PATENT DOCUMENTS

GB         2469740 A     10/2010
WO    WO 2010122292 A2 * 10/2010

OTHER PUBLICATIONS

WIPO; International Search Report and Written Opinion mailed Nov. 5, 2012 in International Application No. PCT/EP2012/065896.

*Primary Examiner* — Tulsidas C Patel
*Assistant Examiner* — Charles Reid, Jr.
(74) *Attorney, Agent, or Firm* — Snell & Wilmer L.L.P.

(57) ABSTRACT

A kite for a system for extracting energy from the wind, the kite comprising: a body having a wing for providing lift; means for connecting the wing to a tether; and means for controlling the flight of the kite in the wind, wherein the wing is constructed with an asymmetry in a spanwise direction from a first end of the wing to a second end of the wing to provide the wing with a naturally asymmetric shape at least when in flight. The asymmetry may be provided to optimise the shape of the wing for a flight pattern in which one end of the wing has a higher speed than the other end of the wing. For example, the asymmetry may be optimised to allow the kite to follow a flight pattern resembling a circle or spiral, from the point of view of a base unit of the system.

22 Claims, 5 Drawing Sheets

(51) Int. Cl.
*F03D 9/25* (2016.01)
*F03D 13/20* (2016.01)

(52) U.S. Cl.
CPC ........ *F03D 13/20* (2016.05); *F05B 2240/921* (2013.01); *Y02E 10/70* (2013.01); *Y02E 10/728* (2013.01)

(58) Field of Classification Search
USPC .................................. 290/44, 55; 244/153 R
See application file for complete search history.

(56) References Cited

U.S. PATENT DOCUMENTS

| | | | |
|---|---|---|---|
| 5,102,071 A * | 4/1992 | Rieleit | 244/152 |
| 5,727,756 A * | 3/1998 | Rowe | 244/153 R |
| 6,003,816 A * | 12/1999 | Lee | 244/153 R |
| 6,327,994 B1 * | 12/2001 | Labrador | 114/382 |
| 6,854,690 B2 * | 2/2005 | Tabor | 244/154 |
| 7,093,803 B2 * | 8/2006 | Culp | 244/153 R |
| 8,018,079 B2 * | 9/2011 | Kelly | 290/1 R |
| 8,162,265 B2 * | 4/2012 | Mears | 244/153 R |
| 8,740,153 B2 * | 6/2014 | Specht et al. | 244/153 R |
| 8,922,041 B1 * | 12/2014 | North et al. | 290/44 |
| 2002/0040948 A1 | 4/2002 | Ragner | |
| 2002/0056995 A1 * | 5/2002 | Saiz | 290/55 |
| 2002/0092947 A1 * | 7/2002 | Felker | 244/35 R |
| 2005/0127240 A1 | 6/2005 | Culp | |
| 2007/0250226 A1 | 10/2007 | Wrage et al. | |
| 2009/0072092 A1 | 3/2009 | Griffith et al. | |
| 2010/0264270 A1 * | 10/2010 | Mears | 244/123.11 |
| 2010/0303634 A1 * | 12/2010 | Long | 416/90 A |
| 2011/0127775 A1 * | 6/2011 | Bevirt | 290/55 |
| 2011/0260462 A1 * | 10/2011 | Vander Lind | 290/55 |
| 2011/0266809 A1 * | 11/2011 | Calverley | 290/55 |
| 2012/0248770 A1 * | 10/2012 | Byun | 290/44 |

* cited by examiner

KITE FOR A SYSTEM FOR EXTRACTING ENERGY FROM THE WIND

FIELD OF THE INVENTION

The invention relates to the conversion of wind power to other forms of energy using kites.

BACKGROUND OF THE INVENTION

People have tried to harness wind energy for thousands of years. Lately, with fossil fuels running out, techniques for converting the energy in the wind to other forms of energy and particularly electrical energy have become more popular. It is known to use wind turbines to extract the energy from the wind. It is also known to use kites to extract the energy from the wind. Kites can fly at an altitude where the wind speeds are more reliable than the wind speed at the height of the hub of a wind turbine. Whereas a wind turbine may have a height of 80 meters, kites can be flown at a typical height of 400 meters to 700 meters or higher. Kites are also easier to maintain and repair since they can be returned to ground level when not used, since the equipment for generating electric power are not required to be mounted at a height and since the kite can be reeled in and transported to a location where repairs can be carried out.

A system for the extraction of energy from the wind using a kite typically includes a kite connected to a base unit using a tether. In one type of system, the tether is wound on a drum in a base unit and the rotation of the drum as the tether pulls away from the base unit is used to generate other forms of energy, for example electricity. In another type of system a propeller or a rotor is provided on the kite and as the wind passes the propeller or rotor, the propeller or rotor is used to generate electrical power which can then be transmitted to the base unit.

To efficiently generate power using a kite, it is desired to have the kite flying through the air. A static kite on the end of a rope can only produce lift relative to the actual wind speed. However, when the kite is allowed to move, lift is obtained based on the apparent wind that is created by the motion of the kite relative to the actual wind. A tethered kite will have a small region of airspace in which it can generate a high tension in the tether but one which is still within the limits of the system and the power generation equipment. The centre of this region will lie directly downwind of the base unit and at an angle of elevation from the base unit dependent on, for example, the design of the kite, the limitations of the power generation equipment and the wind speed. The region in which the appropriate high tension can be generated will hereinafter generally be referred to as "the centre of the wind". If the kite moves away from the centre of the wind, in either azimuth or elevation, the amount of tension it can generate in the tether may be less than optimum for the system for extracting the energy from the wind. It is therefore desirable to keep the kite near the centre of the wind and also to control the kite to move at a high speed in the wind. It has been suggested that a suitable flight pattern is obtained when the kite is controlled to fly in a loop forming a figure-of-eight from the point of view of the base station. However, when following a figure-of-eight flight pattern, regular large steering actions are required, which consumes power and destabilises the kite. It has also been suggested that a substantially circular path, from the point of view of the base station, may allow efficient extraction of wind power. With the tether pulling out, the actual flight path would of course be helical. A circular or helical flight pattern has been found to provide a consistent tension on the tether and a more even power stroke during flight. However, the physical size of the kite means that the speeds of the wing tips are quite different in a circular or helical flight path, which makes the design of the kite difficult.

The invention aims to improve on the prior art.

SUMMARY OF THE INVENTION

According to the invention, there is provided a kite for a system for extracting energy from the wind, the kite comprising: a body having a wing for providing lift; means for connecting the wing to a tether; and means for controlling the flight of the kite across the wind, wherein the wing is constructed with an asymmetry in a spanwise direction from a first end of the wing to a second end of the wing to provide the wing with a naturally asymmetric shape at least when in flight.

The wing would therefore be asymmetric in a spanwise direction during flight when no asymmetric mechanical control forces are applied to it. The wing may be asymmetric in all flight condition and configurations.

The asymmetry may be provided to optimise the shape of the wing for a particular flight pattern. The kite may be operable to fly in a flight pattern in which one wing end has a higher speed than the other wing end and the asymmetry may be conducive to a flight trajectory in which one wing end has a higher speed than the other wing end. The wing end with the higher speed may have a higher speed throughout the trajectory. Alternatively, the wing end with the higher speed may have a higher speed or at least the same speed as the other wing end throughout the trajectory for which the wing is optimised.

The flight pattern may form a closed loop from the point of view of the base unit of the system. The trajectory may form a circle or similar shape, such as an ovoid or an ellipse, from the point of view of the base unit of the system. The asymmetry may be provided to allow the kite to be flown efficiently in a flight path resembling a circle or spiral from the point of view of the base unit. Allowing for the tether to pay out, the flight path may resemble a helix or conical spiral. In other words, the wing may be shaped with consideration to the different flight speeds provided on the wing tips as the wing follows the helical or conical spiral flight path or similar. It has been found that a helical or conical spiral flight pattern allows the wing to be flown near to the centre of the wind where appropriate high tension in the tether can be achieved and the power output of the system to be increased. The asymmetry allows the kite to orient itself as it travels such that the asymmetry is provided about an axis corresponding to the direction of travel along the helical path.

The wing may be asymmetrical in planform. Alternatively, or additionally, the asymmetry can be a cross-sectional asymmetry.

In more detail, the asymmetry in the spanwise direction may be provided by spanwise geometric pre-twist in the wing structure, a spanwise asymmetry in the planform of the wing, for instance through skew or changes in sweep or chord length, a spanwise asymmetry in the cross-sectional profile of the wing, for instance through changes in thickness to chord ratio or airfoil profile, a spanwise asymmetry in the spanwise camber of the wing, for instance the wing may have an negative spanwise camber in the vicinity of one tip of the wing, or by having a wing comprising a number of wing sections, which may be symmetric in themselves, which are connected in such a way as to provide asymmetry in the spanwise direction of the composite wing.

The wing may comprise a plurality of ribs and the profile of at least one rib may be different to the profile of the other ribs of the plurality of ribs to provide the asymmetry in the spanwise direction of the wing.

The wing may be arranged to have an asymmetric shape comprising twist from the first wing end to the second wing end when no mechanical control is applied to the wing using the means for controlling the flight of the kite. In other words, the wing may have an asymmetrical pre-twist in its relaxed state.

The pre-twist may be obtained by a plurality of ribs in the wing arranged at different angles with respect to each other. The pre-twist may also be formed from the cut and the shape of a fabric that forms the wing when inflated.

The wing may comprises a number of interconnected flexible panels shaped so as to provide the wing with said naturally asymmetric shape at least when in flight. Moreover, the wing may assume its natural shape when parts of the wing are inflated. Furthermore, the parts of the wing which require inflation may be inflated by airflow in flight.

The kite may further comprise a rotor mounted to the wing. As the wind passes through the rotor, the rotor can be used to generate electrical power which can be transmitted to the base unit. The rotor may be mounted on a fully rigid asymmetric wing or on an asymmetrically winged plane.

The means for connecting the kite to a tether may be configured to connect the kite to the tether such that an azimuth and an elevation angle of the tether change as the kite flies across the wind. The end of the tether connecting to the kite would follow the flight pattern of the kite, for example the flight pattern resembling a helix.

The wing may be a composite wing comprising two or more interconnected wings forming a number of wing planes. The wingspan can then be reduced, allowing for a tighter turning radius. The wing planes can be joined by lines or webbing or by aerodynamic surfaces such that the composite wing forms a box or ring configuration. At least one of the wing planes or at least the configuration of the composite wing will be provided with an asymmetry in the spanwise direction at least when in flight which is conducive to a circular/helical or similar flight pattern.

The means for connecting the wing to a tether may include a support structure arrangement.

The means for connecting the wing to a tether may comprise a support structure and a plurality of lines connecting the support structure to the wing. The support structure may be in the shape of a platform. The means for controlling the flight of the kite may comprise means for controlling the lengths of at least some of the lines from the wing to the support structure to control the flight of the kite.

The kite may further comprise a plurality of sensors and the means for controlling the flight of the kite may be configured to control the lengths of at least some of the lines in dependence on information from the sensors.

The means for controlling the flight may include a control mechanism including, for example, actuators and a computer system.

According to the invention, there is further provided a system for extracting energy from the wind, the system comprising: one or more kites as set out above; a base unit; and tether means connecting the one or more kites to the base unit.

The one or more kites may comprise a first and a second kite connected the base unit and the tether means may comprise a respective tether for each of the first and second kites. The system may be configured to pay out the tether to the first kite and control the first kite to follow a flight pattern away from the base unit while drawing in the tether to the second kite.

The base unit may comprise a drum for each tether, each tether being wound around its respective drum such that the drum rotates as the respective kite is flown away from the base unit. The base unit may further comprise means for converting the rotary movement of the drums as the respective tethers unwind into electrical energy.

BRIEF DESCRIPTION OF THE DRAWINGS

Embodiments of the invention will now be described, by way of example only, with reference to the accompanying drawings, in which.

DETAILED DESCRIPTION

Figure 1:
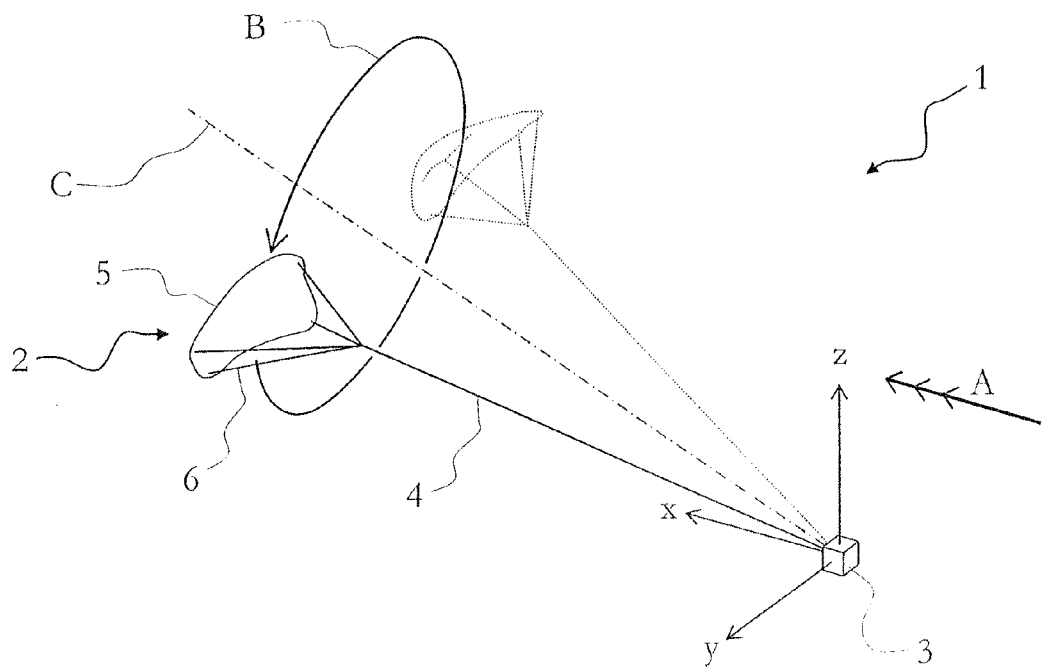
FIG. 1 is a perspective view of a system using an asymmetric kite to extract energy from the wind.

With reference to FIG. 1, there is provided a system 1 for extracting energy from the wind comprising a kite 2, a base unit 3 and a tether 4 tethering said kite 2 to the base unit 3. The kite 2 comprises a body forming at least one wing 5 for generating lift. According to the invention, the wing 5 of the kite is asymmetric in a spanwise direction. The asymmetry along the span of the wing may be provided to improve the efficiency of the system, as will be described in more detail below. The tether 4 is connected to the kite 2 and moves with the kite. In other words, the tether connected to the kite moves up and down in elevation and from left to right in azimuth as the kite flies across the wind. The kite 2 also comprises a support and control arrangement 6 for connecting the wing to the tether and for controlling the flight path of the kite, as will be described in more detail with respect to FIG. 2.

For the purpose of orientation, a set of right handed Cartesian axes (x, y, z) is shown originating at the base unit 3, wherein the z axis is vertical. A wind A blows in the x direction. In the presence of wind A, the kite 2 is flown downwind and above the base unit in the area bound by x>o, |y|≥o, z>o. Lift generated by the wing 5 of the kite 2 exerts a pulling force on the base unit 3 via the tether 4. To maximise the aerodynamic forces on the kite available to perform work or for conversion to mechanical or electrical power, it is necessary for the kite to fly through the air. The region of airspace in which the kite can generate a maximum suitable tether tension for the system is centred in the x-z plane, with respect to FIG. 1, and is at an angle of elevation from the base unit dependent on, for example, the design of the kite, any power generation equipment, and the wind speed. When the kite moves away from this region in either azimuth or elevation, the amount of tether tension it can generate may increase beyond the capabilities of the system or decrease to a level that provides, for example, a lower than desired power output of the system. It is therefore desired to keep the kite in or near this region, also referred to herein as "the centre of the wind", to generate an appropriate high tension on the tether. This can be achieved by flying the kite such that it substantially rotates about an axis of flight C emanating from the base unit 3 in the x-z plane. For example, this can be achieved by flying the kite in a closed loop forming a generally circular trajectory about the axis of flight C from the point of view of the base unit 3. In reality, such a pattern may not be a perfect circle and, furthermore, may in fact be seen as a spiral when viewed from the base unit if the kite is allowed to move away from the base unit by allowing for the tether 4 to pay out, effectively causing a helical flight path. As a further example, a flight path which substantially rotates about the axis of flight C may, as the kite is allowed to move away from the base unit, comprise a conical spiral. In this case the movement of the kite may appear circular from the point of view of the base unit. Essentially, any flight path in which one end of the wing has a higher speed than the other end during at least a large proportion of the flight path provides a desired flight pattern. As the kite is allowed to move away from the base station, the flight pattern may for example, from the point of view of the base station, form a circle, an ovoid, an ellipse, an expanding or reducing spiral or any similar pattern derived from the substantial rotation of the kite about the axis of flight C.

With reference to FIG. 1, the kite 2 is flown in a flight path B which substantially rotates about the axis of flight C. The angle between the axis of flight C and the x-y plane, the angle between the tether 4 and the axis of flight C, and the airspeed of the kite 2 can each be varied as required using the support and control structure arrangement of the kite. The asymmetry of the kite 2 is provided to increase the efficiency with which the kite can follow a flight path resembling a circle, spiral or similar pattern from the point of view of at the base unit. By increasing the efficiency, the speed of the kite and the tension in the tether can be increased, resulting in an improved power output of the system 1. The asymmetry is selected to provide a wing shape that is conducive to following a trajectory in which one end of the wing has a higher speed than the other end. The wing shape is selected to provide a wing that is more efficient at producing lift on a substantially helical or conical spiral flight path B than a kite with spanwise symmetry. Since the wing is pre-shaped to follow a flight path in which one end of the wing has a higher speed than the other, only a small degree of mechanical adjustment using the control and support structure arrangement is necessary to control the kite 2 to follow the desired circling trajectory as it moves away from the base unit 3. By ensuring that the kite tends, without control input, to fly in the desired flight pattern or similarly shaped pattern, the energy required to obtain the desired flight trajectory in the outward high power phase can be minimised. Larger control inputs may be needed to bring the kite back to the base unit 3. To bring the kite in, the kite is typically controlled to be flown away from the centre of the wind to a low-power region or is controlled to glide back towards the base station. For example, when the kite is flown close to a region directly above the base station, the kite can more easily be orientated to generate a smaller or a minimum amount of lift from the wind. By moving the kite to a region where the aerodynamic forces on the kite are lower, less energy is required to bring the kite back towards the base unit.

As indicated in FIG. 1, the tether moves with the kite through the air. The angle between the tether 4 and the axis of flight C can vary as the kite follows its flight path. Moreover, the azimuth and elevation angel of the tether 4 can change as the kite flies through the air. Since the tether attaches directly to the kite, the end of the tether attached to the kite also follows the flight pattern of the kite.

Figure 2:
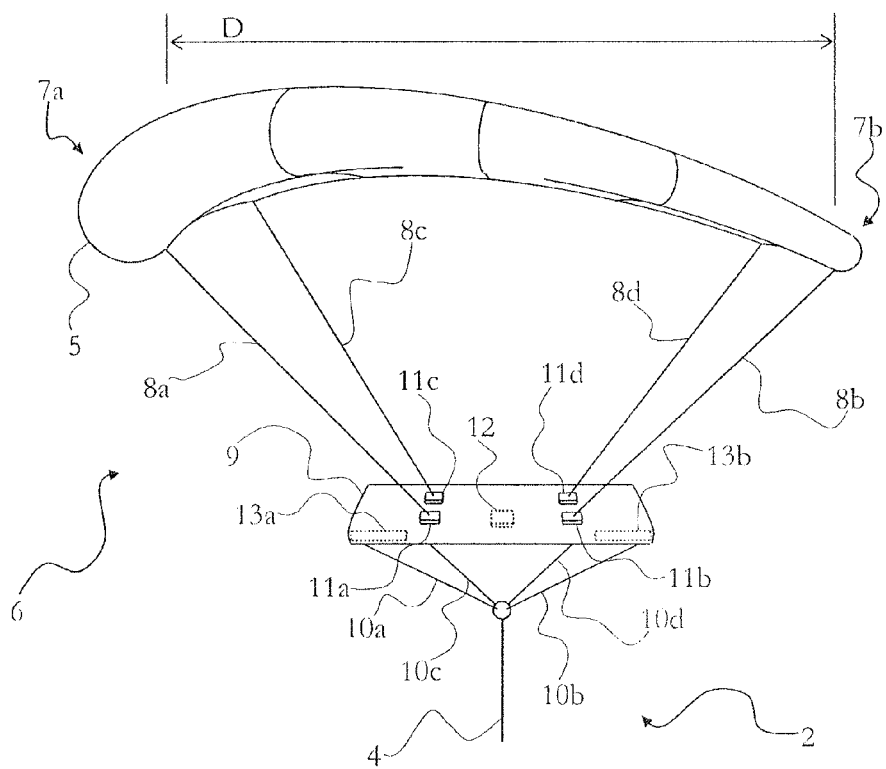
FIG. 2 is a perspective view of the kite of FIG. 1.

The components of the kite will now be described in more detail with reference to FIG. 2. The wing of the kite 2 may be in the form of a flexible aerofoil structure. The structure may be manufactured out of fibre reinforced laminated fabric. The fabric may be cut and formed to provide a desired shape when inflated. For example, the wing may comprise a number of panel sections of flexible fabric which are stitched together. The aerofoil structure may be partly or wholly inflatable. The structure may comprise a number of holes (not shown) for allowing air to enter so as to inflate the structure, for instance by means of ram air inflation. Alternatively, the wing may comprise a relatively rigid structure formed of connected or bonded sections of fibre reinforced plastic, for example a form of carbon fibre, or riveted sections of aluminium sheet metal. The body of the kite forms a wing 5 for providing lift of the kite. As shown in FIG. 2, the wing 5 spans from a first wingtip or edge 7a to a second wingtip or edge 7b in a direction D shown in FIG. 2.

The support and control structure arrangement 6 for connecting the wing to the tether and for controlling the flight of the kite can be implemented in a number of different ways. As shown in FIG. 2, the support and control structure arrangement of the kite may comprise a number of bridle lines 8a, 8b, 8c and 8d provided to connect the wing 5 to a support structure 9. The support structure 9 may be connected to the tether 4 by a number of tether lines 10a, 10b, 10c, 10d. The support structure is provided in FIG. 2 in the form of a semi-rigid or inflatable platform. The bridle lines and the tether lines may be made from a lightweight but strong material. The tether lines 10a, 10b, 10c, 10d and the tether 4 may be connected to the support structure 9 via a swivel coupling (not shown) to allow the kite to follow a circular flight pattern without twisting the tether excessively. The swivel coupling may be motor driven to ensure that the tether is not twisted. The swivel may comprise an encoder or other sensor to count the turns of the swivel relative to the turns of the kite so that the swivel can be motor driven to remove any twist that does not come out naturally. The bridle lines 8a, 8b, 8c, 8d, the support structure 9, the tether lines 10a, 10b, 10c, 10d and the swivel coupling together make up a support structure for connecting the wing to the tether 4. The tether 4 can be provided by any suitable structure for connecting the kite to a base unit. The tether may be made from one or a number of different materials. The core and the outer part of the tether may be made from different materials. Additionally or alternatively, the upper part of the tether 4 may be made from a different material than its lower part.

According to some embodiments, the bridle lines 8a, 8b, 8c, 8d provide control lines that are used to adjust the shape of the wing and control the flight direction and orientation of the kite. The kite may comprise a mechanism for adjusting the effective lengths of the control lines, thereby modifying the shape of the wing. The kite may, for example, comprise an actuator or motor 11a, 11b, 11c and 11d for each control line 8a, 8b, 8c and 8d for controlling the tension in the control lines so as to control the flight of the kite 2. The actuators are mounted to, or provided within, the support structure 9. The actuators adjust the effective lengths of the control lines to control the direction of flight of the kite. In other words, the actuators control the distance between the support structure 9 and the points where the control lines 8a, 8b, 8c, 8d attach to the wing.

The kite 2 may also comprise a computer system 12 comprising a controller for controlling the actuators. Additionally, the kite may comprise a plurality of sensors 13a, 13b for determining the speed and direction of the wind relative to the kite, the direction the kite is pointing, the orientation of the kite and its position along the intended flight path. The actuators 11a, 11b, 11c and 11d, the computer system 12 and the sensors 13a, 13b may be considered together to make up the mechanism for controlling the flight of the kite. The sensors may be mounted to, or provided within, the support structure 9, as shown in FIG. 2. Alternatively, some or all of the sensors 13a, 13b may be mounted on the wing 5. In one embodiment, the kite 2 may include multiple orientation sensors 13a, 13b on the wing 5 to determine the deformation of the wing in flight. The computer system 12 may also be mounted to, or provided within, the support structure 9. Alternatively, the computer system 12 may be distributed between the base unit 3 and the kite 2 or may form part of a larger computer system distributed between the base unit and the kite. The computer system 12 receives information from the sensors 13a, 13b mounted on the platform 9 and/or the wing 5 and then sends signals to the actuators 11a, 11b, 11c, 11d to control the wing 5 based on the information from the sensors. The computer system 12 may also receive information from other kites in the area.

It is contemplated that when the computer system 12 is distributed between the kite 2 and the base unit 3, the sensor information may, in some embodiments, be communicated to the base unit 3, where it is determined how the flight path should be adjusted and instructions for controlling actuators for the control lines 8a, 8b, 8c and 8d or other mechanism for controlling the shape of the wing and the flight pattern can be sent from the base unit 3 to the kite 2. In some embodiments, a redundant computer subsystem may be provided on the kite 2.

The tether 4 may include signalling means (not shown), in the form of, for example, an electrical conductor, for allowing the components of the computer system 12 located on the kite 2 to communicate with the base unit 3. Alternatively, the computer system 12 may comprise a wireless transceiver located on the kite for communicating wirelessly with a wireless transceiver in the base unit 3.

When the kite is used to generate power, the computer system controls the control lines 8a, 8b, 8c and 8d of the kite, based on the information from the sensors, to follow a generally helical flight path away from the base unit. When it is decided to reel in the kite, the computer system controls the control lines 8a, 8b, 8c and 8d of the kite to move the kite to a low-power position where the energy required to reel the kite in are comparably low. The kite can be considered to be flown in three separate modes. The first mode is the outward high force phase when the power is generated from the flight of the kite. The second mode is a mode in which the kite is controlled, using a mechanical control input, to move the kite to a location in which the aerodynamic forces on the wing are lower, such as a location closer to the area above the base unit. The kite may be left in a low power region or enter the third mode which is the retrieval of the kite from the low power region. The third mode typically involves flying the kite in a straight path towards the base station.

It should be realised that although it has been described that the control lines are used to control the flight of the kite, the mechanism for controlling the flight of the kite may use alternative or additional structures for controlling the flight of the kite. For example, the mechanism for controlling the flight path of the kite may include active surfaces on the wing or a warping wing. Actuators may be provided on the wing for controlling the shape of the wing. The computer system 12 may then control the active surfaces or the warping wing based on information from the sensors 13a, 13b to follow the different flight trajectories required to generate power.

The tension in the tether can be converted into mechanical or electrical power in a number of different ways in the base unit, as will be understood by the skilled person in the art, and will not be described in detail herein. In the simplest embodiment, the tether is wound about a clutched drum. The drum can be selectively coupled to an alternator for generating electricity when the kite is flown away from the base unit during the high force phase and to a motor for operating the drum to reel in the tether when the kite is flown towards the base unit. Some of the energy generated during the outward high force phase may be used to power the motor to draw in the kite at the end of the high force phase. A control unit in the base unit may store instructions for controlling the motor. The control unit may be controlled remotely. It may take as input information from the sensors 11a, 11b on the kite 2.

Alternatively, the kite may include a mechanism, such as a rotor, that generates electrical power at an altitude. The electrical power can then be transmitted to the base unit, for example along the tether. The tether may include a conductor for transmitting the electrical power. However, the structural and maintenance requirement for a kite are significantly improved when the heavy power generation equipment can be located in the base unit and not mounted at height.

As yet another alternative, it is possible to convert the energy in the wind to other forms of energy by using a kite to pull a lever and return the lever to its initial position or by using two kites, one on either end of a lever, acting like a seesaw.

The asymmetry of the kite wing can be realised in a number of different ways. The wing will have a natural asymmetry in the spanwise direction which is at least present in normal flight when not affected by any asymmetric control forces. The wing can be asymmetrical in planform and or can have cross-sectional asymmetry provided by changes in the cross-section of the wing. If the wing comprises a relatively rigid structure, the wing may exhibit asymmetry in the spanwise direction both prior to flight and during normal flight. If, for example, the wing comprises a number of stitched fabric panels as previously described, the panels may provide a wing shape which is asymmetric in the spanwise direction when acted on by an airflow experienced in normal flight. The natural asymmetry in the spanwise direction may be provided by a spanwise geometric pre-twist in the wing structure, a spanwise asymmetry in the planform of the wing, for instance through sweep or changes in chord length, a spanwise asymmetry in the cross-sectional profile of the wing, for instance through changes in thickness to chord ratio or airfoil profile, or by having a wing comprising a number of wing sections, which may be symmetric in themselves, which are connected in such a way as to provide asymmetry in the spanwise direction of the composite wing. The asymmetry in the spanwise direction can be accomplished by constructing the wing from one or more asymmetric panels. For example, the upper and lower surfaces of the body of the kite may each be constructed from a number of fabric panels, connected in series from one end of the wing to the other, wherein the surface shape of at least one of the panels is asymmetric in the spanwise direction. Additionally or alternatively, the wing may have an asymmetric supporting structure provided by, for example, ribs of different profiles, that provide the asymmetry in the spanwise direction. With reference to FIGS. 3 to 7, more detailed examples of some of the ways in which the asymmetry can be implemented will now be described.

The wing has an asymmetry to match the different flight speeds of the wing tips and the apparent wind speeds on the wing tips in the desired flight pattern. When the kite is moved in flight pattern resembling, for example, a circle from the point of view of the base unit, the outer tip 7b has a higher speed than the inner wing tip 7a. The asymmetry may be chosen such that the relative lift along the span is balanced even though the speed is increasing towards the outermost tip so that the kite will follow a flight pattern resembling a circle by default. Only minimal mechanical input would then be required to control the flight to follow the desired flight pattern. It should be realised that a flight pattern resembling a circle also includes a generally ovoidal or elliptical flight pattern, from the point of view of the base unit.

Figure 3:
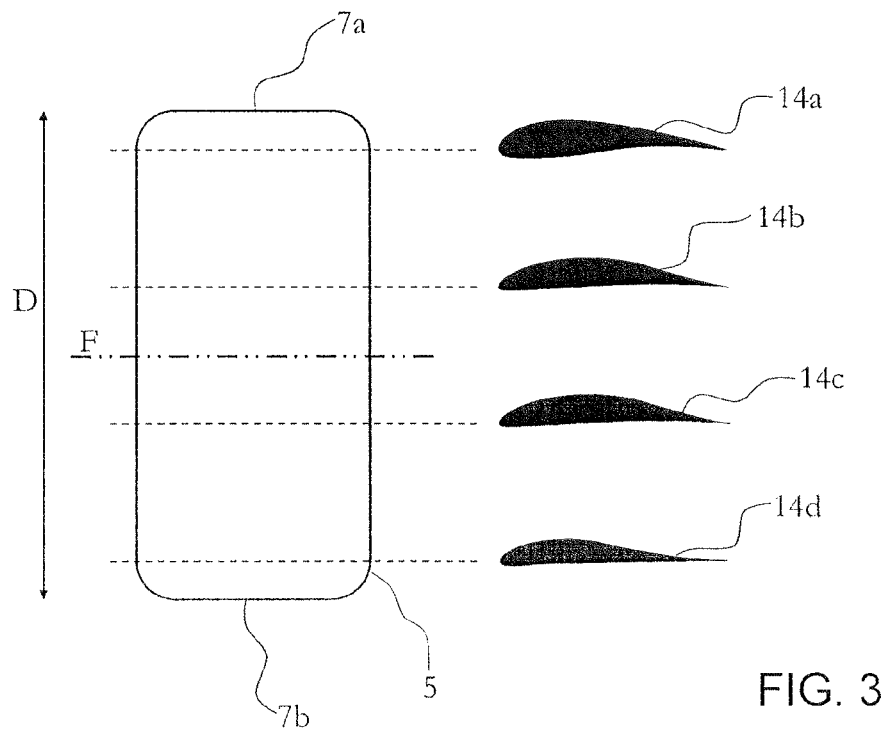
FIGS. 3 to 7 illustrate different shapes of a wing of a kite according to embodiments of the invention.

As shown in FIG. 3, the wing can be symmetrical in planform but have a cross-sectional asymmetry in the spanwise direction D provided by changes in the cross-section of the wing, For example, as indicated in FIG. 3, the wing can be constructed from a fabric mounted on a number of ribs 14a, 14b, 14c, 14d to form a three dimensional structure and the ribs may have different shapes creating a wing with an asymmetrical cross section. At least one rib will have a profile that is different to each of the other ribs of the body of the kite. The wing can be considered to have two portions defined by a mid-plane F, substantially perpendicular to the span D of the wing between the respective wing tips 7a, 7b. The ribs in one portion may have different profiles to the ribs in the other portion. It should he realised that although the wing of FIG. 4 has been shown to be symmetrical in the plan view, a wing according to some embodiments may be asymmetrical in both cross-section and plan view.

Figure 4:
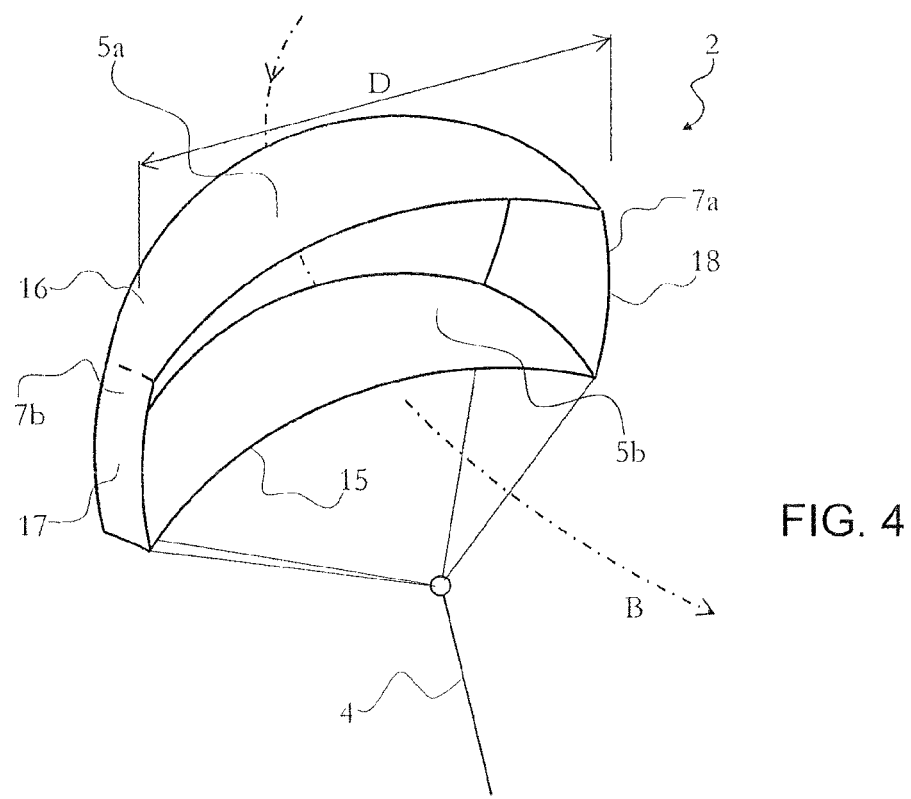

In some embodiments, the body of the kite can have more than one wing forming a composite wing. For example, the kite can be provided with a number of interconnected wings 5a, 5b, wing planes. The wing planes provide a kite with multiple planes. The wing planes may, for example, be stacked to form a bi-plane or a tri-plane wing. By stacking the interconnected wing planes, the wingspan may be reduced and a tighter turning radius can be achieved. At least one of the interconnected wings can have a naturally asymmetric shape in the spanwise direction D conducive to a circular or helical flight pattern. The wing planes can be joined by lines or webbing or by aerodynamic surfaces such that the composite wing forms a box or ring configuration. An example of a composite wing having a box-shape is shown in FIG. 4. In the kite shown in FIG. 4, four flexible panels 15, 16, 17, 18 effectively form a composite wing comprising two interconnected wing planes. Two of the panels 15, 16 provide the interconnected wing planes 5a, 5b in the spanwise direction D and the wing planes are connected by the other two panels 17, 18, which provide the wingtip panels or edges 7a, 7b of the composite wing. The panels 17, 18 providing the edges of the composite wing have different shapes and the panels 15, 16 providing the interconnected wings have different shapes, providing an asymmetric box-shape. One of the panels 17, 18 providing the edges of the wing would have a larger area and when the kite is airborne and controlled to fly in a helical flight pattern away from the base unit 3, the panel 18 having a larger area will be closer to the centre of the circle, or similar shape, formed by the helical flight pattern as seen from the base unit.

Figure 5:
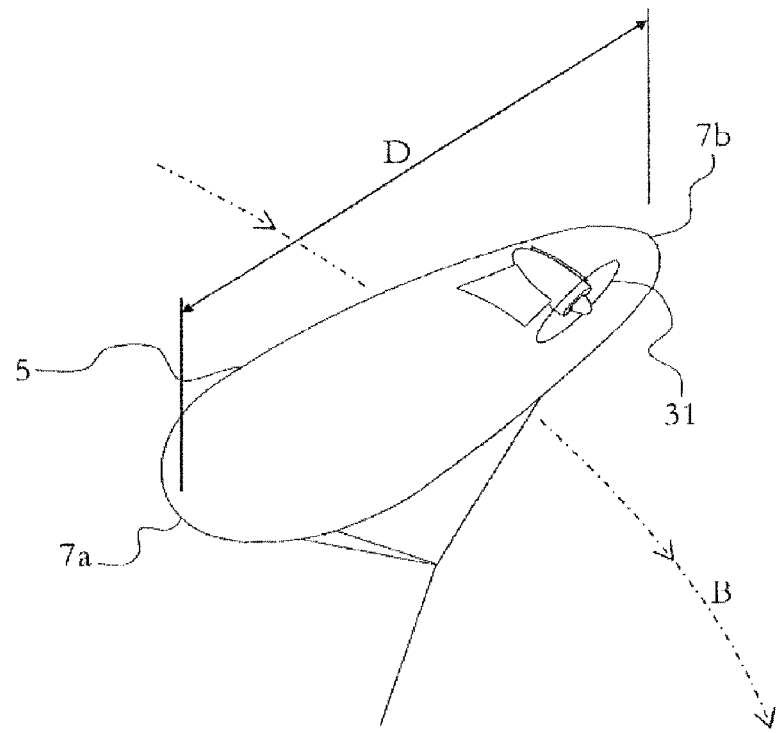

With reference to FIG. 5, asymmetry can be provided by for example a wing 5 having an ovoidal planform shape, with one wing tip 7a having a smaller radius of curvature than the other wing tip 7b. However, it should be realised that a number of different shapes are suitable for providing asymmetry in plan view conducive to a generally helical flight path and the wing does not have to have an ovoidal shape. When the kite follows a generally circular path, the end having a sharper curvature would be orientated away from the centre of the circle.

In some embodiments, a rotor 31 may be positioned on the wing as shown in FIG. 5. The rotor can be used to generate power at an altitude as the wind passes through the rotor. To support the rotor, the wing may be a rigid wing.

Figure 6:
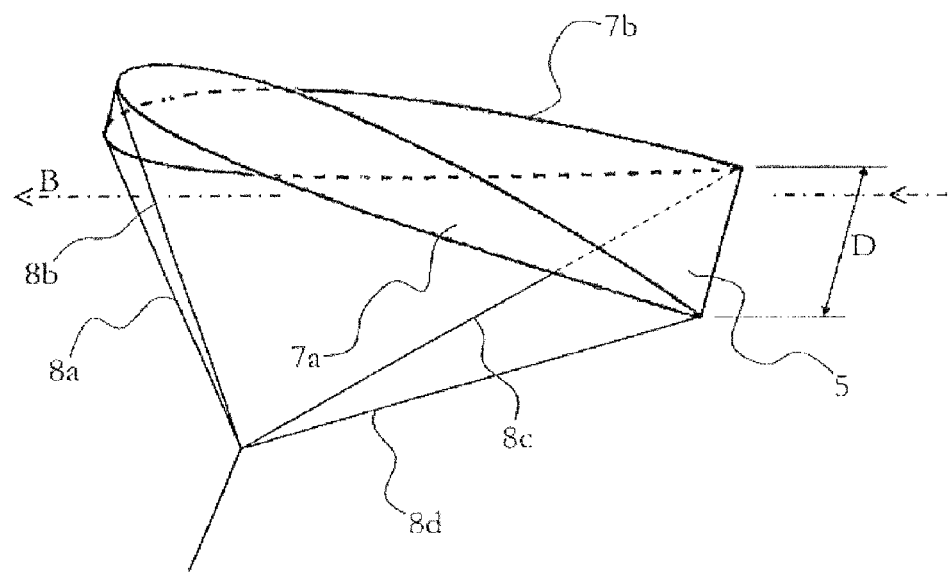

The asymmetry of the wing can alternatively or additionally be provided by a pre-twist, as seen in FIG. 6. The material that forms the wing 5 is cut and formed with consideration to the desired final shape of the wing. For example, if the wing is formed of interconnected panels of inherently flexible material, such as a fabric, such that it requires inflation before flight in order to take its natural shape, the surface shape of the panels will be cut with consideration to the desired inflated shape of the wing. The shape that a wing will naturally take when inflated typically has a twist from one edge to the other edge of the wing so that the natural geometric angle of attack of the wing, the angle between the chord line of the wing and the instantaneous freestream airflow past the wing during flight, changes from one wingtip 7a to the other 7b. Conventionally pre-twist of a wing is symmetric in the spanwise direction. However, according to embodiments of the invention, the wing can be formed with a pre-twist that is asymmetric in the spanwise direction D creating a different angle of attack. Of course, by adjusting the control lines or using another mechanism for controlling the shape of the kite, the angle of attack can also be adjusted. The pre-twist is designed such that the kite flies along flight path B forming a substantially circular (or helical) trajectory by default. Only a small amount of mechanical control, provided by the tension in the control lines or by using another adjustment mechanism, is required to keep the kite moving in a generally circular path as seen from the base unit. To bring the kite back in, the kite may be controlled to fly in a straight line towards the base unit 3.

Figure 7:
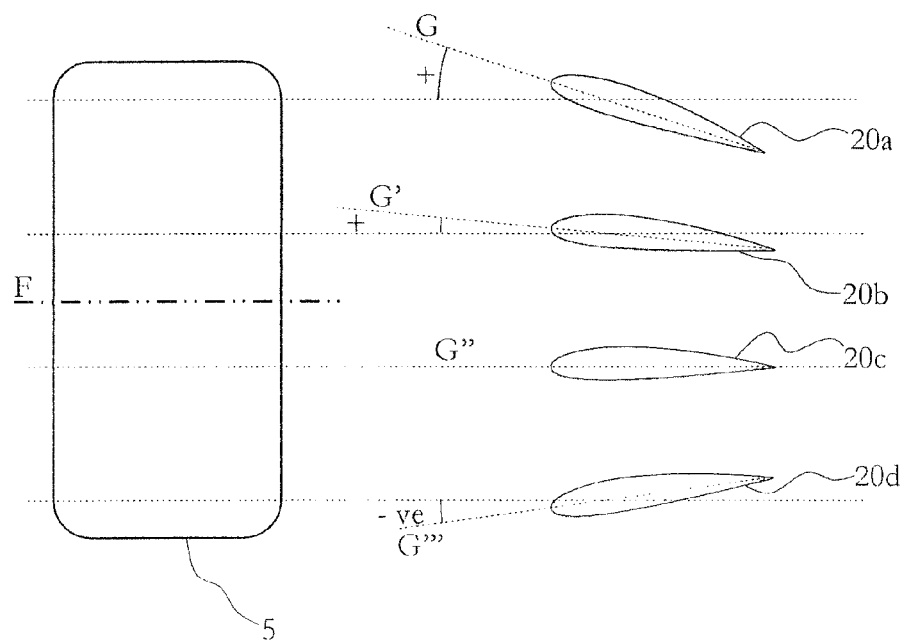

A wing showing another example of a pre-twist is shown in FIG. 7. As shown in FIG. 7, the pre-twist is created using ribs 20a to 20d arranged in the fabric. The ribs may have the same shape but the central axes G, G', G", G'" of the ribs are arranged at angles with respect to each other to form an asymmetric twist along a spanwise direction D.

One example of an asymmetric kite wing comprising asymmetric interconnected wings forming a number of wing planes was described with respect to FIG. 4. It should be realised that the asymmetry can alternatively or additionally be provided by the way in which a number of the wing planes are connected. For example, the strings or panels joining a number of asymmetric or symmetric interconnected wings can be arranged to form an overall asymmetric configuration in the span-wise direction at least when in flight. For example, the lengths of the strings connecting the two interconnected wings can be different at different sides of the wing, providing an overall asymmetric shape.

It should be realised that although the support structure and the components mounted to the support structure are not shown in the kites of FIGS. 3 to 7, the control lines of each kite would be connected to some means for controlling the flight path of the kite. It should be realised that the wing shape shown in FIGS. 3 to 7 are provided to illustrate different ways in which the asymmetry may be provided and these may not be specifically optimised for a particular flight trajectory. It is contemplated that numerical simulations can be used to identify the asymmetry optimised for a particular flight path, such as a substantially helical flight path away from the base unit.

Figure 8:
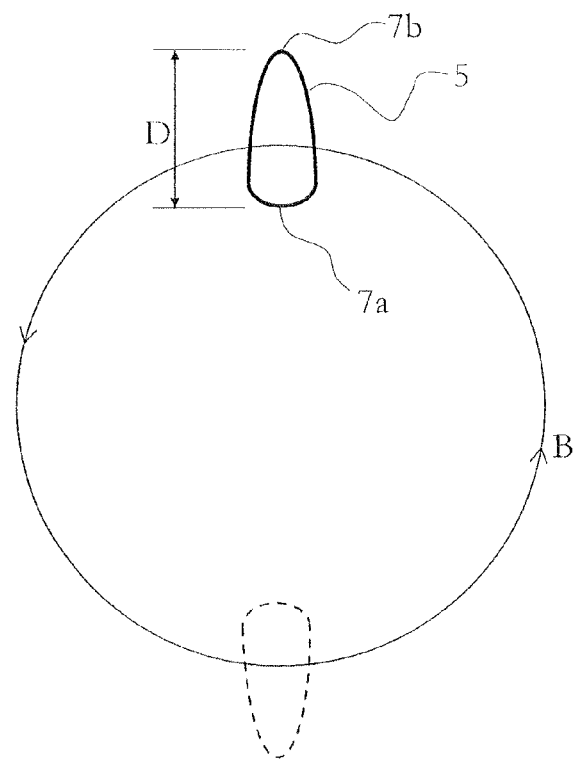
FIG. 8 illustrates how the kite is orientated during its flight along a circular flight path.
Figure 9:
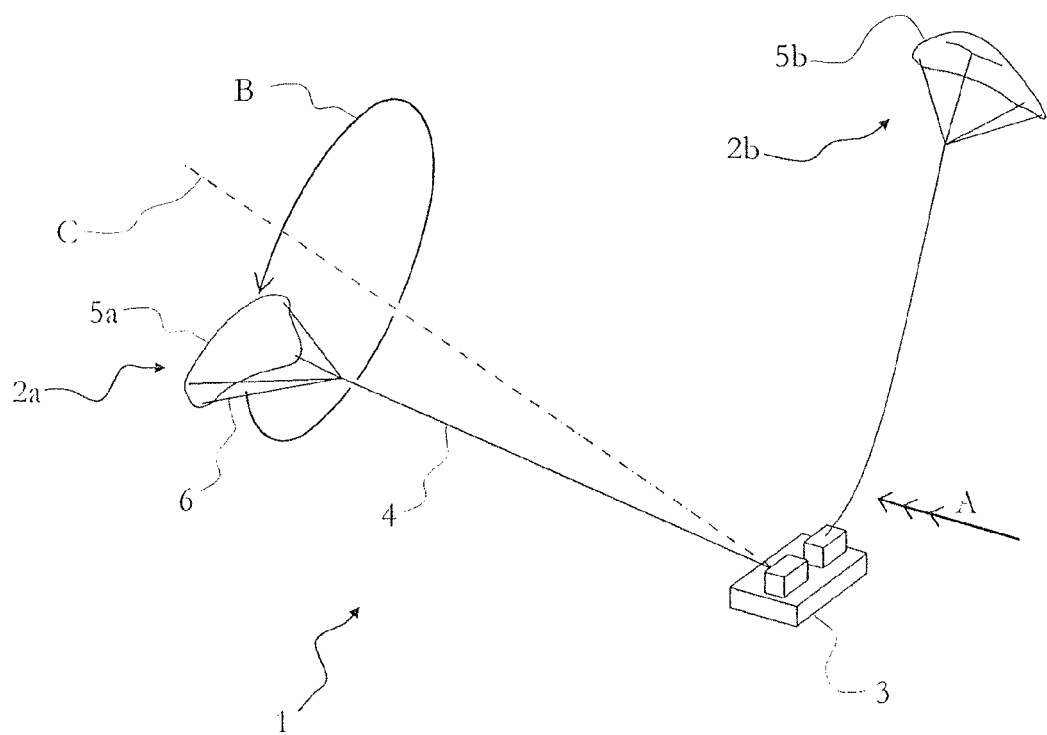
FIG. 9 is a perspective view of a system using two asymmetric kites.

FIG. 8 shows how an asymmetric kite can be orientated with respect to its circular path for one particular asymmetric shape. With reference to FIG. 9, as described above, when the asymmetry of the kite provides a narrower and a wider end, the kite may be orientated such that the wider end of the wing is nearer the centre of the circular flight path than the narrower end. For large kites, the speed of the wingtip 7b facing away from the centre of the circle is significantly higher than the speed of the wingtip 7a facing the centre of the circle. For an asymmetric wing with a wider and a thinner end, the kite may orientate itself as shown in FIG. 8 with the thinner end of the wing towards the outer edge of the circle to allow the kite to fly efficiently.

With reference to FIG. 9 the system for extracting energy from the wind may also comprise more than one kite. The system 1 may be arranged to pay out the tether 4 for one kite 2a while the other kite 2b is being drawn in. Consequently, the system can be configured to continuously convert wind energy to another form of energy. A small proportion of the energy generated from the kite moving away from the base unit 3 may be used to operate a motor to wind in the other kite. The system may comprise means for controlling the kites to follow substantially independent flight paths. Each path comprises a high-energy part provided by the helical flight pattern away from the base unit 3 and a low-energy part closer to a region overhead the base unit 3 in which the energy required to draw in the kite is minimised. A two-kite system has already been described in WO2010/122292 A2. According to embodiments of the invention, the wings of the kites 2a, 2b of the system 1 would be designed with an asymmetry in the spanwise direction to follow circular flight paths more efficiently and thereby provide a system with a higher power output. The computer system for controlling the flight of each kite may take as input information from sensors on both kites.

Whilst specific examples of the invention have been described, the scope of the invention is defined by the appended claims and not limited to the examples. The invention could therefore be implemented in other ways, as would be appreciated by those skilled in the art.

The invention claimed is:

1. A system for extracting energy from the wind, the system comprising:
   a kite;
   a base unit; and
   a tether connecting the kite to the base unit, wherein the kite comprises:
      a body having a wing for providing lift;
      a connector arrangement for connecting the wing to the tether arrangement; and
      a controller arrangement for controlling the flight of the kite in the wind, wherein the wing comprises a number of interconnected flexible panels shaped so as to provide the wing with a naturally asymmetric shape in a spanwise direction from a first end of the wing to a second end of the wing at least when in flight,
   wherein the base unit is configured to pay out the tether to the kite, and
   wherein the asymmetry of the kite and the controller cause the kite to be flown in a flight pattern away from the base unit as the tether is paid out, the flight pattern resembling a helix or conical spiral.

2. A system according to claim 1, wherein the wing is arranged to assume a natural shape when parts of the wing are inflated.

3. A system according to claim 2, wherein parts of the wing are inflated by airflow in flight.

4. A system according to claim 1, comprising a structure for connecting the kite to the tether configured to connect the kite to the tether such that an azimuth and an elevation angle of the tether change as the kite flies in the wind.

5. A system according to claim 1, further comprising a plurality of sensors, the controller arrangement for controlling the flight of the kite being configured to control the lengths of the control lines in dependence on information from the sensors.

6. A system according to claim 1, comprising the kite, hereafter termed a first kite, and a second kite connected to the base unit, the system being configured to pay out the tether to the first kite and control the first kite to follow a flight pattern away from the base unit while drawing in a second tether to the second kite.

7. A system according to claim 6, wherein the base unit comprises a drum for each tether, each tether being wound around its respective drum such that the drum rotates as the respective kite is flown away from the base unit, the base unit further comprising a converter arrangement for converting the rotary movement of the drums as the tethers pay out into electrical energy.

8. A system for extracting energy from the wind, the system comprising:
   a kite;
   a base unit; and
   a tether connecting the kite to the base unit, wherein the kite comprises:
      a body having a wing for providing lift;
      a connector arrangement for connecting the wing to the tether arrangement; and
      a controller arrangement for controlling the flight of the kite in the wind, wherein the wing is constructed with an asymmetric planform in a spanwise direction from a first end of the wing to a second end of the wing to provide the wing with a naturally asymmetric shape at least when in flight,
   wherein the base unit is configured to pay out the tether to the kite, and
   wherein the asymmetry of the kite and the controller cause the kite to be flown in a flight pattern away from the base unit as the tether is paid out, the flight pattern resembling a helix or conical spiral.

9. A system according to claim 8, wherein the wing is arranged to assume its natural shape when parts of the wing are inflated.

10. A system according to claim 9, wherein parts of the wing are inflated by airflow in flight.

11. A system according to claim 8, comprising a structure for connecting the kite to the tether configured to connect the kite to the tether such that an azimuth and an elevation angle of the tether change as the kite flies in the wind.

12. A system according to claim 8, further comprising a plurality of sensors, the controller arrangement for controlling the flight of the kite being configured to control the lengths of the control lines in dependence on information from the sensors.

13. A system according to claim 8, comprising the kite, hereafter termed a first kite, and a second kite connected to the base unit, the system being configured to pay out the tether to the first kite and control the first kite to follow a flight pattern away from the base unit while drawing in a second tether to the second kite.

14. A system according to claim 13, wherein the base unit comprises a drum for each tether, each tether being wound around its respective drum such that the drum rotates as the respective kite is flown away from the base unit, the base unit further comprising a converter arrangement for converting the rotary movement of the drums as the tethers pay out into electrical energy.

15. A system according to claim 8, wherein the asymmetry is due at least in part to sweep.

16. A system for extracting energy from the wind, the system comprising:
   a kite;
   a base unit; and
   a tether connecting the kite to the base unit, wherein the kite comprises:
      a body having a wing for providing lift;
      a connector arrangement for connecting the wing to the tether arrangement; and
      a controller arrangement for controlling the flight of the kite in the wind, wherein the wing is constructed with an asymmetry from a first end of the wing to a second end of the wing to provide the wing with a naturally asymmetric shape at least when in flight, wherein the wing comprises a plurality of ribs and wherein the profile of at least one rib is different to the profile of the other ribs of the plurality of ribs to provide said asymmetry,
   wherein the base unit is configured to pay out the tether to the kite, and
   wherein the asymmetry of the kite and the controller cause the kite to be flown in a flight pattern away from the base unit as the tether is paid out, the flight pattern resembling a helix or conical spiral.

17. A system according to claim 16, wherein the wing is arranged to assume its natural shape when parts of the wing are inflated.

18. A system according to claim 17, wherein parts of the wing are inflated by airflow in flight.

19. A system according to claim 16, comprising a structure for connecting the kite to the tether configured to connect the kite to the tether such that an azimuth and an elevation angle of the tether change as the kite flies in the wind.

20. A system according to claim 16, further comprising a plurality of sensors, the controller arrangement for controlling the flight of the kite being configured to control the lengths of the control lines in dependence on information from the sensors.

21. A system according to claim 16, comprising the kite, hereafter termed a first kite, and a second kite connected to the base unit, the system being configured to pay out the tether to the first kite and control the first kite to follow a flight pattern away from the base unit while drawing in a second tether to the second kite.

22. A system according to claim 21, wherein the base unit comprises a drum for each tether, each tether being wound around its respective drum such that the drum rotates as the respective kite is flown away from the base unit, the base unit further comprising a converter arrangement for converting the rotary movement of the drums as the tethers pay out into electrical energy.

* * * * *